United States Patent
Guo et al.

(10) Patent No.: US 7,050,259 B1
(45) Date of Patent: May 23, 2006

(54) HIGH PRECISION SERVO TRACK WRITING WITH POSITION ERROR SIGNAL FEEDBACK

(75) Inventors: Lin Guo, Milpitas, CA (US); David Tung, Livermore, CA (US); Heng-Poh Khong, Singapore (SG)

(73) Assignee: Maxtor Corporation, Longmont, CO (US)

( * ) Notice: Subject to any disclaimer, the term of this patent is extended or adjusted under 35 U.S.C. 154(b) by 122 days.

(21) Appl. No.: 10/125,052

(22) Filed: Apr. 18, 2002

Related U.S. Application Data (60) Provisional application No. 60/285,056, filed on Apr. 19, 2001.

(51) Int. Cl.
*G11B 21/02* (2006.01)
*G11B 5/596* (2006.01)

(52) U.S. Cl. .................. 360/75; 360/77.03; 360/78.04

(58) Field of Classification Search ............... 360/75, 360/77.02, 77.03, 77.05, 77.06, 77.07, 77.08, 360/77.11, 78.04, 78.11, 78.12, 78.14
See application file for complete search history.

(56) References Cited

U.S. PATENT DOCUMENTS

| 4,920,434 | A  | * | 4/1990 | Brown et al. ............ 360/77.08 |
| RE35,302  | E  | * | 7/1996 | Hoshimi et al. ......... 360/77.11 |
| 6,714,376 | B1 |   | 3/2004 | Brunnett et al. ............. 360/75 |

FOREIGN PATENT DOCUMENTS

EP     000977181 A2 *  2/2000

\* cited by examiner

*Primary Examiner*—Andrew L. Sniezek

(57) ABSTRACT

A servo writer system for a disk drive uses the reader element of a magnetic transducer head in the disk drive to read head position information during servo writing of the disk drive. A positioning system in the servo writer uses both the head position information and actuator position information, as feedback signals to accurately position the transducer during servo writing, resulting in high quality servo tracks.

33 Claims, 5 Drawing Sheets

HIGH PRECISION SERVO TRACK WRITING WITH POSITION ERROR SIGNAL FEEDBACK

RELATED APPLICATIONS

Applicant claims the priority of U.S. Provisional Application No. 60/285,056, entitled "High Precision Servo Track Writing with Position Error Signal Feedback", filed on Apr. 19, 2001, which is incorporated herein by reference.

FIELD OF THE INVENTION

The present invention relates to data storage in data disk drives, and more particularly to servo writing of data disk drives.

BACKGROUND OF THE INVENTION

Disk drives are well known in the computer art for providing secondary mass storage with random access. A disk drive essentially comprises one or more magnetic data storage disks rotating on a spindle by a spindle motor, within an enclosed housing. A magnetic transducer head is placed on an actuator arm and positioned very closely to each data storage surface by a slider suspended upon an air bearing. Servo information are typically written in servo sectors which interrupt data sectors or blocks on each disk. Servo information provide a servo control loop in the disk drive with head position information to enable a head positioner mechanism, such as a rotary voice coil motor, to move the actuator, and therefore the head, from track to track during random access track seeking operations, and to maintain the head in proper alignment with a track centerline during track following operations when user data is written to or read from the available data block storage areas of the disk surface.

A such, the servo control loop is used to control head positioning as the head is being moved transversely across tracks and to cause the head to remain over a particular data track as the disk spins. The servo loop controls the acceleration of the head which results from a force supplied by the electric motor on the actuator. The input to the servo system are readings of head position made by the head itself. The head position is determined from servo information written directly onto the disk by a servo writer as part of the manufacturing process. The servo information may include the track number as well as an indication of how far the recording head is from the track center line. That is, a certain number of bits of information on each track are reserved for indicating position. As the head passes over the indicators, the track over which the head is sitting is determined by the head itself and supplied to the servo system. The indicators are at regularly spaced locations. Thus the input to the servo is not continuous but is sampled.

A servo track writer is a manufacturing unit, typically stabilized on a large granite base or sufficient isolation, to minimize unwanted vibration and employ an encoder (e.g. laser interferometry) for position measurements. As shown by example in FIG. 1, a servo writer 10 typically includes a positioning system 12 for moving an arm 14 that carries a push-pin 16 which extends into a disk drive 17 for direct mechanical access to a head actuator arm 18 of the disk drive 17. The head actuator arm 18 carries a transducer head 20 for writing data to, and reading data from a data disk 22 in the disk drive. The servo writer 10 may also include a fixed head for writing a clock track onto a disk surface.

Figure 1:
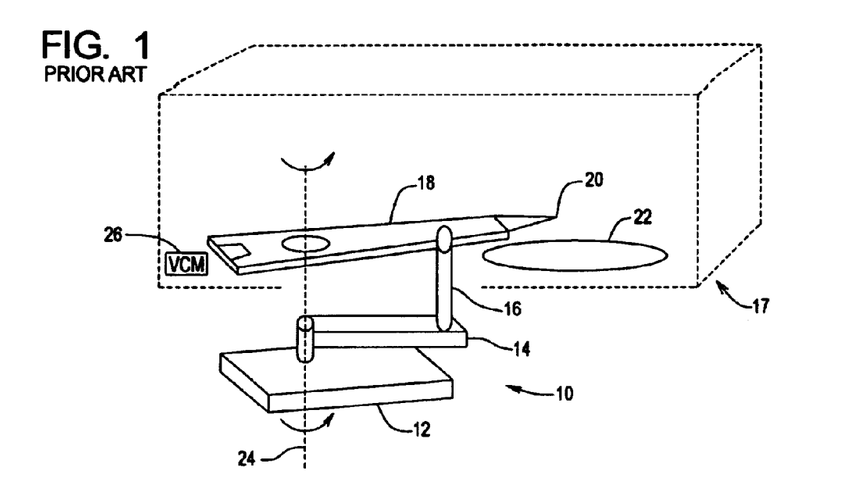
FIG. 1 shows a simplified block diagram of a conventional servo writer for writing servo tracks on a disk in a disk drive.

The servo writer 10 supplies power to the disk drive spindle motor (not shown) for rotating the disk 22 therein, and the positioning system 12 moves the actuator 18 and head 20 via the push-pin 16, across the raw disk 22 in the disk drive 17 to write track address and fine servo information at several specified locations called sectors for each track on the disk 22. As shown, the push-pin 16 extends through an opening in the disk drive 17 housing and mechanically contacts the actuator arm 18. This servowriter arm 14 which rotates about a shaft 24 coaxial with the axis of rotation of the actuator arm 18. The angular position of the shaft 24 is determined by a servo controlled motor in the servo writer positioning system 12 which uses an encoder or other interferometer for position feedback. In order to maintain the actuator arm 18 against the push-pin 16, a small bias current is applied to an actuator voice coil motor 26 of the disk drive 17, in a direction to oppose the movement of push-pin 16. This insures precision in locating the head in the servo track writing process.

Figure 2:
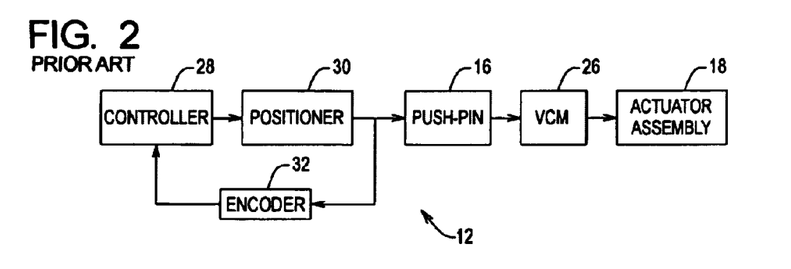
FIG. 2 shows a block diagram of a conventional control scheme for the servo writer of FIG. 1.

FIG. 2 shows a block diagram of an example conventional feedback control scheme for the positioning system 12 of the servowriter 10 in FIG. 1. The positioning system 12 comprises a controller 28, a positioner 30 and an encoder 32. The encoder 32 senses and provides the rotational position of the actuator arm 18, to the controller 28 to control the positioner 30 for moving the push-pin 16, thereby injecting a force input to actuator assembly 18, to position the transducer head 20 for writing precise servo tracks on the disk 22 in the disk drive.

Another version of the servowriter 10 uses a non-contact optical push pin system, instead of mechanical push-pin 16 in FIG. 1. With the optical system, a small diffraction grating is placed on the actuator arm 18. The servo writer arm 14 includes an interferometric position sensor (e.g., encoder) that emits an optical beam into the hard disk drive and determines the position of the actuator arm 18 by monitoring the light diffracted from the grating. Closed loop servo control of the actuator arm 18 position with respect to the shaft 24 is achieved using this encoder to provide position feedback, and the internal disk drive voice coil motor 26 is controlled by the controller 28 and/or the positioner 30, to drive the actuator arm 18. The angular position of the servo writer arm shaft is still controlled by the positioning system of the servo writer.

In that case, the push-pin 16, is an optical push-pin, wherein the encoder senses relative motion/position between the arm 18 and the optical pushpin arm 14, and generates a feedback signal accordingly for the controller to actively control the VCM 26 to follow the optical push pin. Instead of a biasing force to the arm 18 in the mechanical case, there is a control signal to the VCM 26. The positioning system 12 uses the encoder feedback signal as the error between the laser head and arm 18 and determines errors in the arm 18 following the optical pushpin. The positioning system controls the VCM 26 such that the arm 18 follows the pushpin accurately, such that whenever the positioning system moves the optical pushpin (laser head) around, the VCM 26 follows it.

However, a disadvantage of above control schemes is that the only feedback position signal available is the rotational position of the push-pin via the encoder 32. The exact position of the head 20 over the disk 22 in the disk drive 17 is not known. The mechanical vibrations of the structures (actuator arm/suspensions, etc.) between the push-pin and the head 20 are not detected. Furthermore, the motion of the disk 22 which contributes to part of the head off-track in not detected. As such, corrections to head position to compensate for vibrations and head off-track position cannot be made, resulting in writing low quality servo tracks with the head, which may have to be re-written.

Another disadvantage of conventional servo writers is the lengthy servo writing time. In one conventional servo writing example, for a disk drive having two disks (four data storage surfaces) and requiring three servo-writer-controlled passes of the head over a single track during servo writing, total servo writing time might consume as much as 45 minutes or more. Thus, servo writing using conventional servo writers requires time penalties in the manufacturing process attributable to servo writer bottleneck.

There is therefore a need for a method and apparatus for servo writing which provides more precise position control of the servo writing head for improved servo writing quality, and reduces servo writing time and expense.

BRIEF SUMMARY OF THE INVENTION

The present invention satisfies these needs. In one embodiment, the present invention uses the readers of the magnetic heads of a disk drive to read position information during servo writing of a data disk in the disk drive, using a servo track writer. A positioning system in the servo writer uses both actuator position information and said head position information as feedback signals, to more accurately position said head during servo writing, resulting in written servo tracks with improved quality.

In one case, the head includes a read element and a write element wherein the read element is offset from the write element. Further, the data disk includes preliminary servo information bursts pre-recorded in servo tracks thereon for starting the servoing process. As the pre-recorded servo bursts pass under read element, a position error signal (PES) is generated based on the location of the bursts relative to the read element, indicating position of the read element relative to the data disk. Actuator position information and the head PES information is used for servoing to position the head, and write servo information bursts on the data disk with the write element of the head. Then the read element is positioned to read the newly written servo information bursts as they pass under read element to obtain a new head position error signal. The new PES along with actuator position are used for servoing to position the head, and write further servo information bursts on the data disk with the write element of the head. The process is repeated until the disk is servo written.

As such, according to the present invention, head off-track is measured directly using the PES, and used as feedback along with actuator position in a servo writer servo loop for servoing during servo writing. Much higher sampling rates allow the servo writer servo loop to have high bandwidth. Position errors due to written in run out are no larger than the drive non-repeatable PES. Because the servo loop is closed around the PES during servo writing, much higher disk RPM may be used to take advantage of the high bandwidth servo loop. As a result, servo writing time can be reduced as well.

BRIEF DESCRIPTION OF THE DRAWINGS

These and other features, aspects and advantages of the present invention will become understood with reference to the following description, appended claims and accompanying figures where:

Like reference numbers refer to like elements.

DETAILED DESCRIPTION OF THE INVENTION

Figure 3:
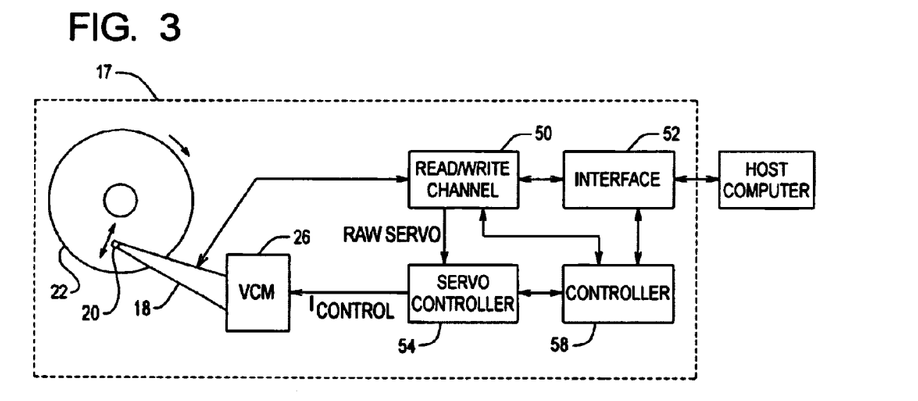
FIG. 3 shows a simplified block diagram of the architecture of an example disk drive in which aspects of the present invention can be implemented.

FIG. 3 shows a block diagram illustrating an example disk drive 17 that can be servo written, according to the present invention. Once servo written, the disk drive 17 can be coupled to an external host computer that uses the disk drive 17 as a mass storage device. It should be appreciated that the blocks illustrated in FIG. 3 are functional in nature and do not necessarily represent discrete hardware elements. For example, in one approach, two or more of the functional blocks within the disk drive 17 are implemented in software in a common digital processor. The disk drive 17 includes at least one data storage disk 22, at least one transducer head 20, an actuator arm assembly 18, a voice coil motor (VCM) 26, a read/write channel 50, an interface unit 52, a servo controller 54 and a disk drive controller 58.

In a preferred embodiment, the disk drive 17 includes multiple disks 22 in a vertical stack arrangement with one transducer 20 for each operative disk surface. Typically, both surfaces of each disk 22 will be operative for storing user data and, therefore, the disk drive 17 will include two transducers 20 for each disk 22. Single sided disk arrangements can also be used.

The interface unit 52 is operative for providing an interface between the disk drive 17 and the host computer. During read and write operations, the interface unit 52 provides a communications path, including data buffering functions, between the host computer and the read/write channel 50. In addition, the interface unit 52 is operative for receiving commands and requests from the host computer and directing them to the controller 58. The controller 58 then carries out the commands by appropriately controlling the elements within the disk drive 17.

During disk drive operation, the VCM 26 is operative for controllably positioning the transducers 20 with respect to their corresponding disk surfaces in response to a control signal (e.g., Icontrol) generated by the servo controller 54.

The transducers 20 are all coupled to a single integrated arm assembly 18 and thus move together under the influence of the VCM 26. When performing a read or write operation, the controller 58 instructs the servo controller 54 to move one of the transducers 20 to a target track on a corresponding disk surface so that a data transfer can take place. The servo controller 54 then generates a control signal to move the identified transducer 20 from a present location to the indicated target track in a process known as a "seek" operation. Once the transducer 20 has arrived at the target track, the servo controller 54 enters a "track follow" mode during which the transducer 20 is maintained in a substantially centered position above the target track. The bulk of the data transfer between the transducer 20 and the target track occurs during this track follow mode.

The read/write channel 50 is operative for, among other things, performing the data transformations necessary to provide communication between host computer and the disk 22. For example, during a write operation, the read/write channel 50 converts digital data received from the host computer into an analog write current for delivery to one of the transducers 20. During a read operation, the read/write channel 50 provides the data transformations necessary for converting an analog read signal received from one of the transducers 20 into digital representation that can be recognized by the host computer. The read/write channel 50 is also operative for separating out servo information read by a transducer and for directing this servo information to the servo controller 54 for use in positioning the transducer 20.

To prepare the disk drive 17 for data storage operations described above, the unassembled disk drive is placed on a servo writer 10 such as shown in FIG. 1 for writing servo information on each raw disk 22. The servo writer 10 typically requires direct mechanical access to the head actuator arm, and may also have a fixed head for writing a clock track onto one disk surface. The servo writer 10 supplies power to the disk drive spindle motor (not shown), moves the actuator 18 and head 20 very precisely across the raw disk 22 and writes servo information at several specified locations called sectors for each track on the disk 22.

Figure 4:
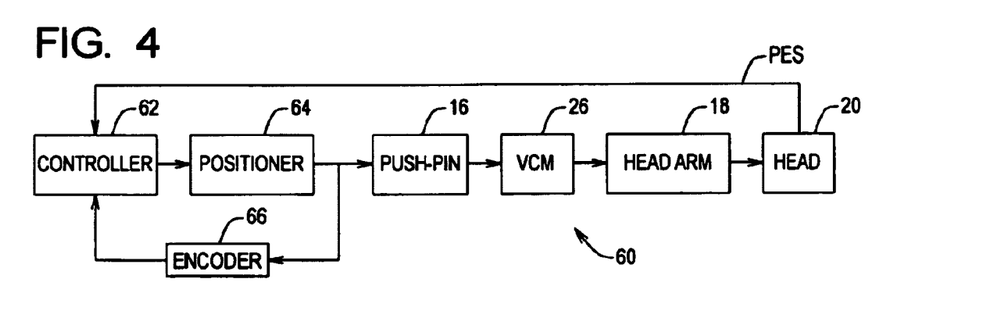
FIG. 4 shows an example block diagram of an embodiment of a control scheme for a servo writing process according to the present invention.

According to an embodiment of the present invention, an improved feedback and control scheme for the servo writer 10 of FIG. 1, precisely moves the actuator 18 and the head 20 via the push-pin 16 which extends through an opening in the disk drive housing and contacts the actuator arm 18. FIG. 4 shows an example block diagram of an embodiment of a feedback control scheme according to the present invention for a new positioning system 60 for the servo writer 10, instead of the conventional positioning system 12 of FIG. 2. The example positioning system 60 of FIG. 4 comprises a controller 62, a positioner 62 and an encoder 66, interconnected as shown. The encoder 66 senses and feeds back the rotational position of the servo writer arm 14 and push-pin 16, to the controller 62 as a first feedback signal.

The present invention further uses the read element of each magnetic head 20 to read head position information from the corresponding disk 22, and generate a position error signal therefrom, during servo writing of the disk drive 17 on the servo writer 10. The position information from the PES is used as a second feedback signal to the controller 62, whereby the heads 20 can be more accurately positioned during servo writing, resulting in written servo tracks with better quality. The controller 62 controls the positioner 64 for moving the push-pin 16 by the arm 14, thereby injecting a force input to the VCM structure (including the VCM 26 and actuator arm 18 carrying the transducer head 20) to position the transducer head 20 for writing servo tracks on the disk 22 in the disk drive 17. In one embodiment, the encoder 66 measures the position of the positioner 64, and the controller 62 determines how much the positioner 64 should moved based on the feedback signals from the encoder 66.

The PES position information allows detection of the mechanical vibrations of the structures (arm/suspensions etc) between the push-pin 16 and the heads 20. Furthermore, the PES allows detection of the motion of the disk 22 which contributes to part of the head off-track. As such, head position corrections to compensate for vibrations and head off-track position can be made with the controller 62, resulting in high quality servo tracks which maybe written in less time than is conventional.

The example controller 62 in FIG. 4 comprises a dual-input, single output controller which is a category of multi-input multi-output controllers. The dual inputs to the controller 62 are the feedback signal from the encoder 66 and the PES feedback signal from the head 20. The controller 62 generates an output signal therefrom, to control the positioner 64 to move the actuator arm 18 via the pushpin 16. Multi-input, multi-output controllers are known in the art as multivariable feedback systems, examples of which are described in a typical reference titled "Multivariable Feedback Design", J. M. Maciejowski, Addison Wesley, 1989.

In conventional servo writer positioning systems as shown by example in FIG. 2, a single input, single output controller 28 is used, wherein only one feedback signal from the encoder 32 is input to the controller 28. The single feedback signal informs the controller 28 of the position of the arm 16, not the position of the head 20, whereby the controller 28 commands the positioner 30 to cause movement of the arm 18 to eliminate error between where the actuator arm 18 should be and where the encoder detects the arm 18 to be.

By contrast, according to the embodiment of the present invention in FIG. 4, two different feedback signals, the position of the arm 18 represented by the encoder signal and the position of the head 20 represented by the head PES, are provided to the dual-input controller 62. The encoder signal represents the position error of the arm 18 detected at the positioner 64 by the encoder 66. For example, if the controller 62 commands the positioner 64 to rotate the arm 18 by 10,000 encoder counts (e.g., via the push-pin 16), if the expected rotation does not occur (e.g., the actual rotation is 11,000 encoder counts), then the difference 9 between the expected and actual encoder count is the actuator arm position error (represented by the encoder feedback signal) at the positioner level. Further, due to the mechanical structure dynamics in the push-pin 16 and the actuator arm 18, the encoder feedback signal may not reflect the actual head position. As such, the head PES is fed back into the controller 62 such that the controller 62 controls the positioner 64 to move the arm 18, based on both the decoder feedback signal (i.e., actuator arm position error) and the head PES, more precisely than is conventional.

The encoder feedback signal and the head PES feedback signal provide position information to the controller 62 at different levels of the VCM mechanical system 18, by sensing position at different locations of that system, and therefore provide better feedback of the behavior of that system. This results in more precise control of the VCM arm 18 movement to eliminate the head PES (as well as any actuator arm position error represented by the encoder feedback signal), rather than total control based on the encoder feedback signal as is conventional. The conventional position control system of FIG. 2 controls actuator arm and head position only based on the encoder feedback signal, because that is the only feedback signal utilized.

In a simplified example operation, the controller 62 in FIG. 4 commands the positioner 64 to move the actuator arm 18 to reposition the head 20 from location A (e.g., track 100) to location B (e.g., track 500) on the disk 22. The controller 62 first calculates a rotation angle for this motion that is equivalent to N (e.g., 10,000) encoder counts. The controller 62 then issues a command to the positioner 64 to move the actuator arm 18 (e.g., via the pushpin 16 or control signals to the VCM 26), for the calculated number counts N so that the arm 18 ideally positions the head 20 on the target location B on the disk 22. But, due to factors such as vibrations, disk motion and external disturbance to the mechanical structures 16 and 18, the arm 18 may position the head 20 on a location C, instead of the location B. The distance difference between location B and C is represented by the head PES. The head PES along with the encoder signal are fed back to the controller 62, which determines an equivalent encoder count M (e.g., 1000 counts), representing the distance the arm 18 has to be further moved to move the head 20 from location C to the location B on the disk 22.

As such, although the controller 62 initially issues a move command to the positioner 64 for N counts, using the head PES feedback, in this example the controller 62 issues another move command to the positioner 64 for M counts to move the VCM arm 18 from the location C by M counts towards the location B, thereby correcting the head position and minimizing the head PES. Because the head PES is based on the location of the head 20 relative to the disk 22 (i.e., final location), and the encoder signal is based on the location of the arm 18 (i.e., intermediate location), the controller 62 provides better control of the actuator arm 18 for more precise positioning of the heads 20 carried by the actuator arm 18 for precise servo writing. Other methods of using the encoder feedback signal, and the head PES in the controller 62 for precise positioning of the VCM arm 18 and therefore heads 20, are possible. Further, the present invention contemplates feeding other position information into the controller 62 to monitor disturbance sensors and reject their contributions through the positioner 64.

In one version, the dual-input, single-output controller 62 can be implemented in software/firmware as a state-space controller. In that case, the head PES is used as an additional state in a conventional state-space implementation of a single-input, single-output controller.

Figure 5A:
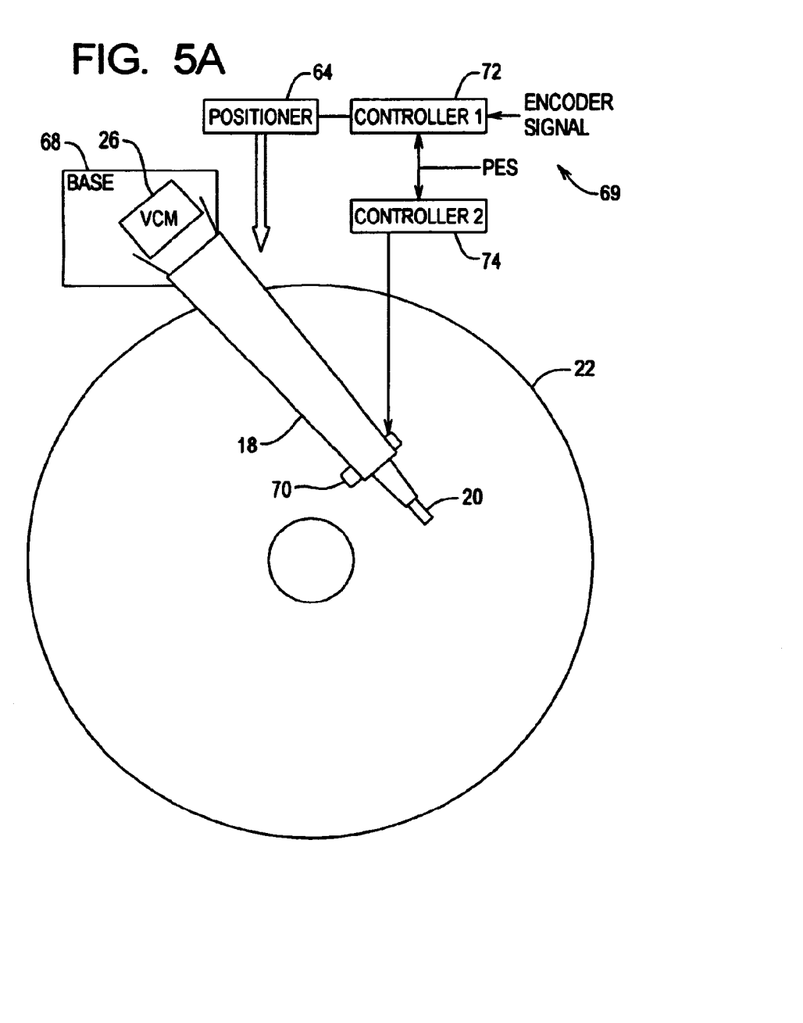
FIG. 5A shows an example block diagram of a dual-actuator disk drive such as a two-stage actuator and servo writing control system, according to another embodiment of the present invention.

According to another embodiment of the present invention, disk drives with dual-actuators can take full advantage of the high bandwidth dual-loop servo control according to the present invention. Referring to FIG. 5A, a dual-actuator disk drive such as a two-stage actuator includes a base 68, a rotary coarse actuator 18 moved by a voice coil motor 26 rotatably mounted on the base 68; a microactuator 70 mounted on the coarse actuator 18 and carrying a transducer 20 at a front end portion, for read/operation on a disk 22. According to the 11 present invention, a positioning system 69 for precise positioning of the transducer head 20 relative to the disk 22 during servowriting includes a first controller 72 to control driving of the coarse actuator 18 via a positioner 64, and a second controller 74 to control driving of the microactuator 70. The head PES and an encoder signal representing actuator position information are provided to the first controller 72 (forming a dual feedback loop) and the head PES is provided to the second controller 74, wherein the controllers 72 and 74 cooperatively move the actuator assembly to precisely position the transducer head 20 relative to the disk 22.

Figure 5B:
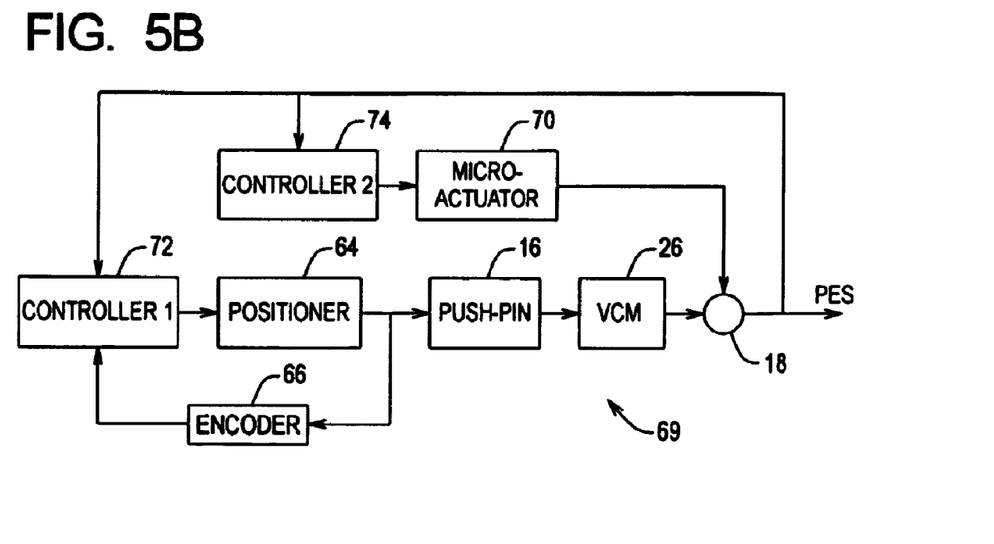
FIG. 5B shows example block diagram of another embodiment of a control scheme for a servo writing process for the control system of FIG. 5A, according to the present invention.

FIG. 5B shows an example block diagram of an embodiment of the positioning system 69 of FIG. 5A, including a dual-loop servo control scheme for a servo writing process in a two-stage actuator disk drive, according to the present invention. In addition to the VCM 26 (coarse actuator) for moving the actuator arm 18, the micro-actuator (second actuator) 70 on the arm 18 makes small adjustments to the head position. In this scheme, the head PES and the encoder signals are fed back into the first controller 72 (e.g., Controller1), for controlling the positioner 64, and the head PES is fed back into the second controller 74 (e.g., Controller2), that drives the micro-actuator 70. The two controllers 72 and 74 cooperate as a closed loop system, providing stable closed loop system and higher performance. The two controllers 72, 74 can be off-the-shelf controllers, that are tuned to cooperate and perform the actuator arm control functions based on the head PES and the encoder feedback signals, according to the present invention.

Figure 6:
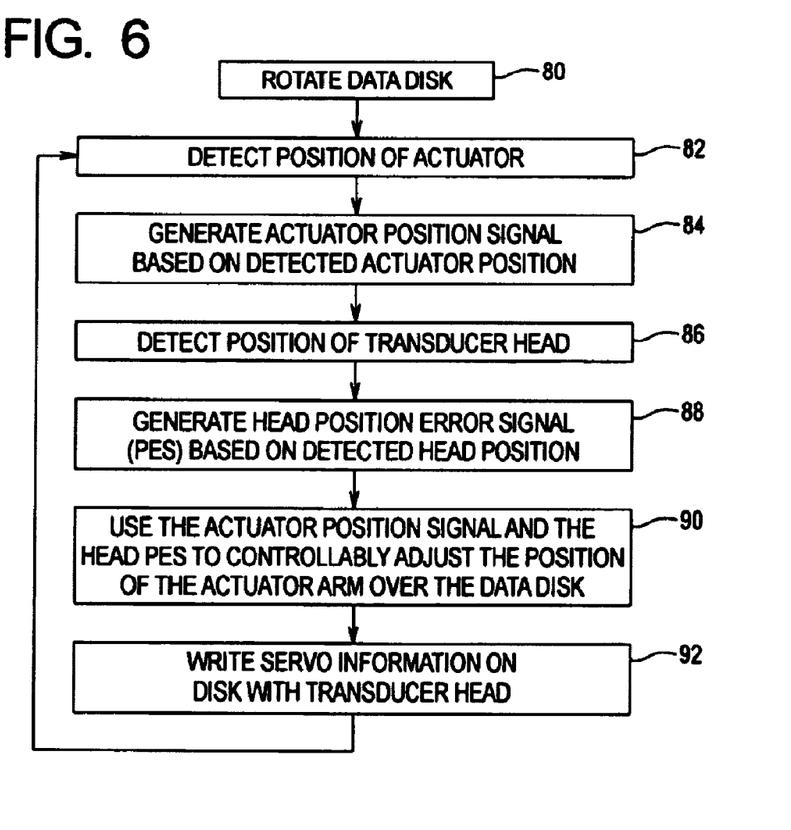
FIG. 6 shows a flowchart of an embodiment of the steps of servo writing according to an aspect of the present invention.

FIG. 6 shows a flowchart of an example method for writing servo information in a single-stage actuator data disk drive 17 of FIG. 3, according to the present invention. The method includes the steps of: rotating the data disk 22 (step 80); positioning the actuator 18 for servo writing servo information on the data disk 22 in a servo writing feedback loop by: detecting the position of the actuator arm 18 (step 82) and generating an actuator position signal therefrom (step 84); detecting the position of the head 20 relative to the data disk 22 (step 86) and generating a head PES therefrom (step 88); using both the actuator position signal and the head PES to controllably adjust the position of the actuator arm 18 over the data disk for writing servo information on the data disk with the head 20 (step 90); and writing servo information on the data disk 22 with the head 10 (step 92). For the two-state actuator disk drive, the step 90 above further includes the steps of using the head PES to make adjustment to the head position using the microactuator 70.

In one version, the above steps and schemes can be implemented in firmware for a servo loop system in the servo writer positioning system. Other implementations are possible and contemplated by the present invention. Further, the present invention is equally applicable to mechanical and optical pushpin systems described above, wherein for the optical system, the output of the controller is used to control the VCM 26 to drive the actuator arm 18 rather using of the push-pin 16. The head PES from the head is still fed back to the controller as described above.

In one example, to generate the head PES, patterns of servo bursts are used by a servo loop system for positioning of the head 20 relative to the data disk 22. The bursts include flux transition, and when the head 20 passes over the flux transitions, the head 20 generates signals with repeating cycle variations which can be demodulated and decoded to provide the head PES, indicating position of the head over the disk. The head PES signal is typically used to generate an input signal for the disk drive head positioning servo system in the disk drive 17, to correct the position of the head 20 relative to a head target/destination position.

Figure 7:
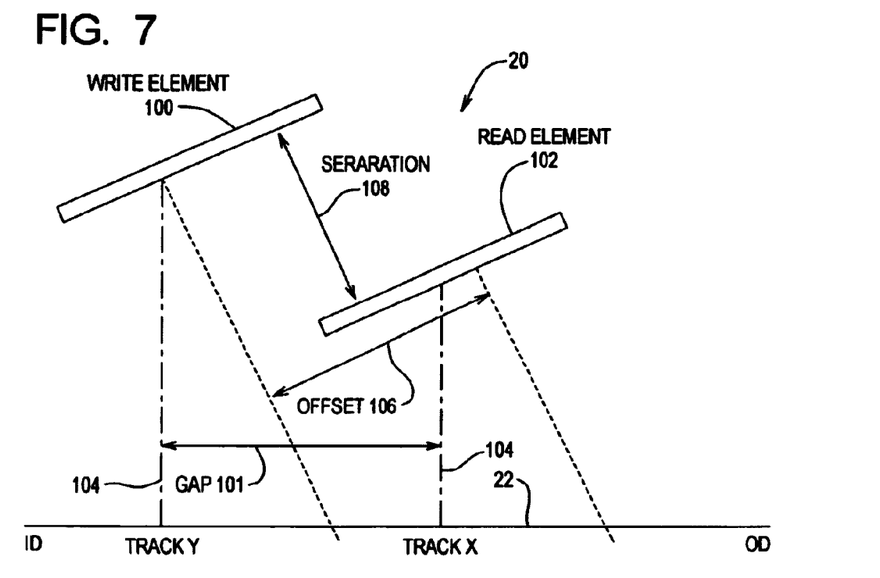
FIG. 7 shows an diagrammatic example of the writer offset to reader of a transducer head in the disk drive of FIG. 3 used for writing servo tracks.

Referring to FIG. 7, an example head (transducer) 20 currently being used, employs dual elements 100 and 102. The inductive write element 100 has a relatively wide recording gap 101 is used to write information onto tracks 104 on disk 22. And, the so-called giant-magneto-resistive read element 102 has a relatively narrow playback gap, used to read information from the tracks 104 on the disk 22. With this arrangement, high data track densities are possible, leading to disk drives in relatively small packages or form-factors with very large data storage capacities.

FIG. 7 shows a diagrammatic, close view, of the example head 20 in the disk drive 17 of FIG. 3, used for writing servo tracks. In FIG. 7 the write element 100 and the read element 102 of the magnetic head 20 have a certain reader/writer off-set 106 and separation 108. With appropriate off-set 106 and separation 108, the read element 102 can be reading position information on one track 104 (e.g., Track X) to provide said head PES to the servo writer positioning system, while the write element 100 can be on another track 104 (e.g., Track Y) writing servo bursts, across the entire range of the head position on the disk 22 from inner dimension (ID) to outer dimension (OD). As such, an example servo writing scheme according to the present invention can be carried out by the following steps.

Several "start-up" circular servo tracks are pre-recorded on the disk 22 at either OD or ID at low RPM by the servo writer. Further, track straightening techniques (i.e., Embedded Repeatable Runout Correction) with many revolutions of averaging can be carried out for each of the start up servo tracks. An example of such track straightening process is provided in the copending application Ser. No. 09/753,969 filed Jan. 2, 2001, incorporated herein by reference. The resulting servo tracks are high accuracy circular tracks. Because only very small number of such start-up tracks are needed, the time required to write those servo tracks is very short.

The start-up servo tracks serve as starting reference tracks for writing the rest of the servo tracks. To write the next servo track, the write element 100 is positioned by the action of the push-pin 16 of the servo writer 10 on the actuator arm 18, with the proper DC offset, while the read element 100 reads the servo information off one of the written servo tracks to provide real head off-track position information (head PES). Because the read and write processes cannot be physically carried out simultaneously by the same head 20, an "interleaf" scheme is used.

Figure 8:
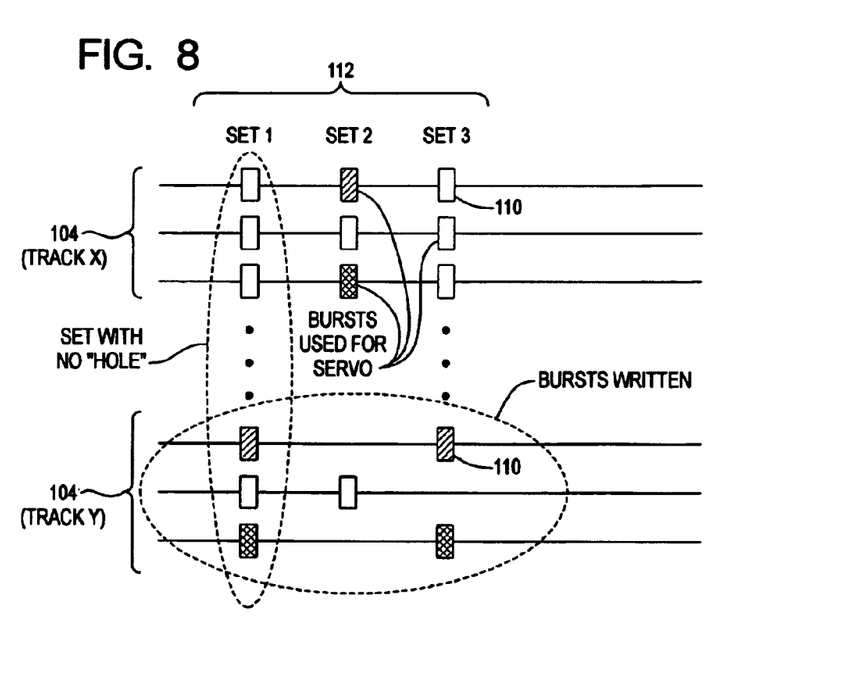
FIG. 8 illustrates servo burst scheme for reading position information while writing servo information on a data disk.

An example of such a scheme is shown in FIG. 8, wherein three "sets" of servo bursts 110 (e.g., Set1, Set2 and Set3) are utilized. While the read element 100 servos on Set2 on a first track 104 (e.g., Track X) to generate the head PES, the write element 100 is writing servo bursts for Set1 and Set3 on an adjacent track 104 (e.g., Track Y). Then, after a disk revolution, while servoing on Set3 with the read element 102 to generate the head PES, servo bursts for Set1 and Set2 are written with the write element 100. As a result, Set1 is always written without any "holes". Further, in order to prevent error from propagating, optionally "real-time" error correction schemes can be used, such that when each servo burst is written, the head PES is recorded and used later as a correction value when the servo burst is used for tracking while writing the subsequent servo bursts. The process is repeated until the disk 22 is servo written. In one example, the servo bursts comprise circumferentially sequential, radially staggered single frequency bursts, one or more of which are sequentially read as the read element passes by each servo sector.

Figure 9:
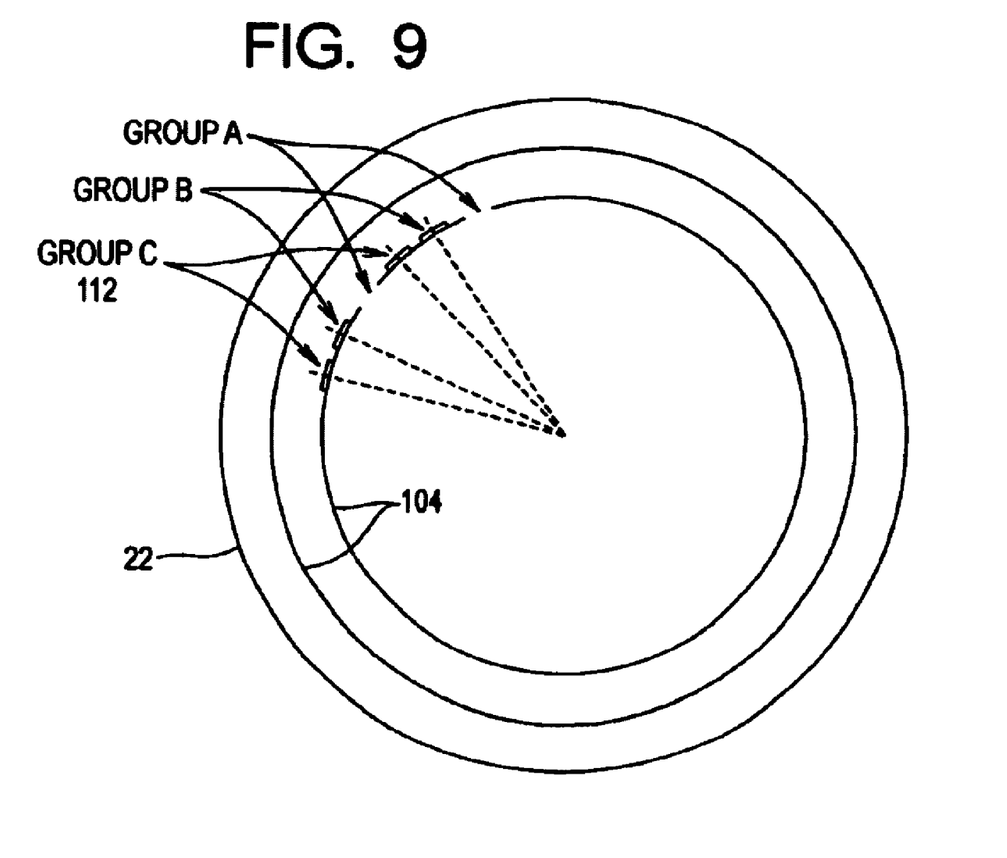
FIG. 9 illustrates groups of servo bursts for providing position information according to FIG. 8.

In the FIG. 8 example, the three servo burst sets (i.e., Set1, Set2 and Set3) are equivalent to 1X servo, (i.e., single rate). However, as shown in FIG. 9, many such kinds of "three set" groups 112 (Groups A, B, C, . . . ) can be written and used as servo bursts 110 during subsequent servo writing. Because each group 112 provides single rate 1 X servo, by having multiple groups, servo sampling rate can be much higher than the disk drive servo rate (single rate), by using a micro-processor on the servo writer to process the servo bursts 110.

As such, according to the present invention, head off-track is measured directly using the head PES, during servo track writing. Much higher sampling rates allow the servo writer servo loop to have high bandwidth. Position errors due to written in run out (WRO) are no larger than the on drive non-repeatable PES. Because the servo loop is closed around the PES during servo writing, much higher PRM may be used to take the advantage of high bandwidth servo. As a result, servo writing time can be reduced as well.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for writing servo information in a data disk drive having a data disk and a read/write transducer head attached to an actuator assembly positionable over the data disk, comprising the steps of:
   rotating the data disk;
   positioning the actuator assembly for servo writing servo information on the data disk, including the steps of, in a servo writing feedback loop:
      detecting the position of the actuator assembly and generating an actuator position signal therefrom;
      detecting the position of the transducer relative to the data disk and generating a position error signal (PES) therefrom;
      using both the actuator position signal and the PES signal to controllably adjust the position of the actuator assembly over the data disk for writing servo information on the data disk with the transducer; and
   writing servo information on the data disk with the transducer.

2. The method of claim 1, wherein positioning the actuator assembly further includes the steps of:
   providing a servo writer having a positioning system; and
   using both the actuator position signal and the PES signal in the servo writer positioning system to controllably adjust the position of the actuator assembly over the data disk with the servo writer for writing servo information on the data disk with the transducer.

3. The method of claim 2, wherein positioning the actuator assembly further includes the steps of mechanically driving the actuator assembly with a driving member extending from the servo writer into the disk drive, under the control of the positioning system of the servo writer.

4. The method of claim 2, wherein:
   the disk drive further includes an actuator motor for moving the actuator assembly over the data disk in response to control signals; and
   the steps of positioning the actuator assembly further includes the steps of:
      using both the actuator position signal and the PES signal in the servo writer positioning system to generate an actuator position control signal therefrom; and
      providing the actuator position control signal to the actuator motor for controllably adjusting the position of the actuator assembly over the data disk with the servo writer for writing servo information on the data disk with the transducer.

5. The method of claim 1, wherein:
   the transducer includes a read element and a write element wherein the read element is offset from the write element; and the data disk includes preliminary servo information bursts pre-recorded in servo tracks thereon, such that the step of detecting the head position relative to the data disk further includes the steps of: reading the preliminary servo bursts as they pass under the read element, and generating said head PES based on the location of the bursts relative to the read element, indicating radial position of the read element relative to the data disk.

6. The method of claim 5, wherein the step of writing the servo information further includes the steps of:

writing servo information bursts on the data disk with the write element of the transducer;

positioning the read element to read the written servo information bursts as they pass under the read element, and generating said head PES based on the location of the servo bursts relative to the read element; and writing further servo information bursts on the data disk with the write element.

7. The method of claim 1, wherein:

the transducer includes a read element and a write element wherein the read element is offset from the write element; and the data disk includes preliminary servo information bursts pre-recorded thereon, such that the step of detecting the head position relative to the data disk further includes the steps of:

reading the servo bursts as they pass under the read element, and generating readback signals with repeating cycle variations corresponding to the servo bursts; and demodulating and decoding the readback signals to generate said position error signal, indicating radial position of the read element relative to the data disk.

8. A method for writing servo information in a data disk drive having a data disk and an actuator assembly positionable over the data disk, the actuator assembly including a base, a rotary coarse actuator rotatably mounted on said base, a microactuator mounted on said coarse actuator arm and carrying a transducer head at a front end portion for reading data from, and writing data to, the data disk, comprising the steps of:

(a) rotating the data disk;

(b) detecting the position of the coarse actuator arm relative to the data disk, and generating an actuator position signal based on the detected actuator arm position;

(c) detecting the position of the transducer relative to the data disk;

(d) generating a position error signal (PES) based on the detected transducer position;

(e) using both the actuator position signal and the PES to controllably adjust the position of the coarse actuator arm over the data disk;

(f) using the PES to control the microactuator to controllably adjust the position of the transducer over the data disk; and (g) writing servo information on the data disk with the transducer head.

9. The method of claim 8, wherein the actuator position signal represents a difference between an intended position of the coarse actuator arm and the actual position of the coarse actuator arm relative to the disk.

10. The method of claim 9, wherein step (e) further includes the steps of controllably adjusting the position of the coarse actuator arm to minimize said difference between the intended coarse actuator arm position and the actual coarse actuator arm position.

11. The method of claim 8, wherein:

the PES represents a difference between an intended transducer position and the actual transducer position relative to the disk; and step (e) further includes the steps of controllably adjusting the position of the coarse actuator arm to minimize the PES.

12. The method of claim 8, wherein:

the PES represents a difference between an intended transducer position and the actual transducer position relative to the disk; and step (f) further includes the steps of controllably adjusting the position of the transducer over the data disk with the microactuator to minimize the PES.

13. The method of claim 8, wherein:

the transducer includes a read element and a write element wherein the read element is offset from the write element; and the data disk includes preliminary servo information bursts pre-recorded in servo tracks thereon, such that the step of detecting the head position relative to the data disk further includes the steps of: reading the preliminary servo bursts as they pass under the read element, and generating said PES based on the location of the bursts relative to the read element, indicating radial position of the read element relative to the data disk.

14. The method of claim 13, wherein the step of writing the servo information further includes the steps of:

writing servo information bursts on the data disk with the write element of the transducer;

positioning the read element to read the written servo information bursts as they pass under the read element, and generating said PES based on the location of the read servo bursts, relative to the read element; and writing further servo information bursts on the data disk with the write element.

15. The method of claim 8, wherein:

the transducer includes a read element and a write element wherein the read element is offset from the write element; and the data disk includes preliminary servo information bursts pre-recorded thereon, such that the step of detecting the head position relative to the data disk further includes the steps of:

reading the servo bursts as they pass under the read element, and generating readback signals with repeating cycle variations corresponding to the servo bursts; and demodulating and decoding the readback signals to generate said PES, indicating radial position of the read element relative to the data disk.

16. A system for writing servo information in a data disk drive having a data disk and a transducer head carried by an actuator assembly positionable over the data disk, comprising:

an actuator assembly position detector, external to the disk drive, that detects the position of the actuator assembly and generates an actuator position signal therefrom;

a head position detector that detects the position of the transducer head relative to the data disk and generates a position error signal (PES) therefrom;

a positioning system which receives the actuator position signal and the PES signal, and generates therefrom a control signal for positioning the actuator assembly over the data disk during servowriting; and a positioner which controllably adjusts the position of the actuator assembly based on the positioning system control signal, for positioning the transducer head to write servo information on the data disk.

17. The system of claim 16, wherein the positioner comprises:

a driver motor for a driving member extending into the disk drive for mechanically driving the actuator assembly under the control of the positioning system.

18. The system of claim 16, wherein the positioner comprises:

a driver motor connected to the positioning system and the actuator assembly, wherein the driver motor controllably adjusts the position of the actuator assembly under the control of the positioning system.

19. The system of claim 16, wherein the positioner comprises:

an actuator motor in the disk drive for moving the actuator assembly over the data disk in response to control signals; and the control signal of the positioning system is provided to the actuator motor for controllably adjusting the position of the actuator assembly over the data disk.

20. The system of claim 16, further comprising:

a servo pattern generator, coupled to the transducer head, which provides servo information for the transducer head to write on the data disk.

21. The system of claim 16, wherein:

the transducer head includes a read element and a write element wherein the read element is offset from the write element;

the data disk includes preliminary servo information bursts pre-recorded in servo tracks thereon; and the head position detector generates the position error signal by reading the preliminary servo bursts as they pass under the read element, and generates said PES based on the location of the bursts relative to the read element, such that the positioning system uses both the actuator position signal and the position error signal, to control the positioner to position the actuator assembly to write servo information bursts on the data disk with the transducer write element.

22. The system of claim 21, wherein the positioning system is further configured to control the positioner to position the actuator assembly for the read element to read the written servo information bursts as they pass under the read element, such that the head position detector generates said position error signal based on the location of the read servo bursts relative to the read element, and the positioning system controls the positioner to position the actuator assembly for the write element to write further servo information bursts on the data disk.

23. The system of claim 16, wherein:

the transducer head includes a read element and a write element wherein the read element is offset from the write element;

the data disk includes preliminary servo information bursts pre-recorded in servo tracks thereon;

the head position detector generates the PES by reading the servo bursts as they pass under the read element, and generates readback signals with repeating cycle variations corresponding to the servo bursts, and further comprising a demodulator for demodulating and decoding the readback signals to generate said PES.

24. A system for writing servo information in a data disk drive having a data disk and an actuator assembly positionable over the data disk, the actuator assembly including a base, a rotary coarse actuator arm rotatably mounted on said base, a microactuator mounted on said coarse actuator arm and carrying a transducer head at a front end portion for reading data from, and writing data to, the data disk, comprising:

an actuator position detector, external to the disk drive, that detects the position of the actuator arm and generates an actuator position signal therefrom;

a head position detector that detects the position of the transducer head relative to the data disk and generates a position error signal (PES) therefrom;

a positioning system including: (i) a first controller which receives the actuator position signal and the PES signal, and generates therefrom a control signal for positioning the actuator arm over the data disk during servowriting, and (ii) a second controller which receives the PES and controls the microactuator to controllably adjust the position of the transducer over the data disk; and a positioner which controllably adjusts the position of the actuator arm based on the positioning system control signal, for positioning the transducer head to write servo information on the data disk.

25. The system of claim 24, wherein the actuator position signal represents a difference between an intended position of the coarse actuator arm and the actual position of the coarse actuator arm.

26. The system of claim 24, wherein the first controller controllably adjusts the position of the coarse actuator arm to minimize said difference between the intended coarse actuator arm position and the actual coarse actuator arm position.

27. The system of claim 24, wherein:

the PES represents a difference between an intended transducer position and the actual transducer position relative to the disk; and the first controller controllably adjusts the position of the coarse actuator arm to minimize the PES.

28. The system, of claim 24, wherein:

the PES represents a difference between an intended transducer position and the actual transducer position relative to the disk; and the second controller controllably adjusts the position of the transducer over the data disk with the microactuator to minimize the PES.

29. The system of claim 24, wherein:

the actuator position signal represents a difference between an intended position of the coarse actuator arm and the actual position of the coarse actuator arm;

the PES represents a difference between an intended transducer position and the actual transducer position relative to the disk;

the first and second controllers cooperate to: (i) minimize said difference between the intended coarse actuator arm position and the actual coarse actuator position arm, and (ii) minimize the PES.

30. The system of claim 24, wherein:

the transducer head includes a read element and a write element wherein the read element is offset from the write element;

the data disk includes preliminary servo information bursts pre-recorded in servo tracks thereon; and the head position detector generates the PES by reading the preliminary servo bursts as they pass under the read element, and generates said PES based on the location of the bursts relative to the read element, such that the positioning system uses both the actuator position signal and the PES, to control the positioner to position the actuator arm to write servo information bursts on the data disk with the transducer write element.

31. The system of claim 30, wherein the positioning system is further configured to control the positioner to position the actuator arm for the read element to read the written servo information bursts as they pass under the read element, such that the head position detector generates said PES based on the location of the read servo bursts relative to the read element, and the positioning system controls the positioner to position the actuator arm for the write element to write further servo information bursts on the data disk.

32. The system of claim 24, wherein:

the transducer head includes a read element and a write element wherein the read element is offset from the write element;

the data disk includes preliminary servo information bursts pre-recorded in servo tracks thereon;

the head position detector generates the PES by reading the servo bursts as they pass under the read element, and generates readback signals with repeating cycle variations corresponding to the servo bursts, and further comprising a demodulator for demodulating and decoding the readback signals to generate said PES.

33. The system of claim 24, further comprising:

a servo pattern generator, coupled to the transducer head, which provides servo information for the transducer head to write on the data disk.

* * * * *